United States Patent
Savov et al.

(10) Patent No.: US 10,936,373 B2
(45) Date of Patent: Mar. 2, 2021

(54) TAG-BASED CONTROL OF HOSTED COMPUTE RESOURCES

(71) Applicant: VMware, Inc., Palo Alto, CA (US)

(72) Inventors: Boris Savov, Sofia (BG); Petar Mitrov, Sofia (BG); Rostislav Georgiev, Sofia (BG); Ventsyslav Raikov, Sofia (BG)

(73) Assignee: VMware, Inc., Palo Alto, CA (US)

( * ) Notice: Subject to any disclaimer, the term of this patent is extended or adjusted under 35 U.S.C. 154(b) by 146 days.

(21) Appl. No.: 15/904,351

(22) Filed: Feb. 24, 2018

(65) Prior Publication Data

US 2019/0266025 A1 Aug. 29, 2019

(51) Int. Cl.
*G06F 9/50* (2006.01)
*G06F 9/48* (2006.01)
*G06F 9/455* (2018.01)

(52) U.S. Cl.
CPC ............ *G06F 9/5077* (2013.01); *G06F 9/455* (2013.01); *G06F 9/45533* (2013.01); *G06F 9/45558* (2013.01); *G06F 9/48* (2013.01); *G06F 9/4881* (2013.01); *G06F 9/50* (2013.01); *G06F 9/5005* (2013.01); *G06F 9/5027* (2013.01); *G06F 9/5038* (2013.01); *G06F 9/5061* (2013.01); *G06F 9/5072* (2013.01); *G06F 2009/45595* (2013.01)

(58) Field of Classification Search
CPC ... G06F 9/455; G06F 9/48; G06F 9/50; G06F 9/45533; G06F 9/45558; G06F 9/4881; G06F 9/5005; G06F 9/5027; G06F 9/5038; G06F 9/5061; G06F 9/5077
See application file for complete search history.

(56) References Cited

U.S. PATENT DOCUMENTS

| | | |
|---|---|---|
| 2010/0198972 A1 | 8/2010 | Umbehocker |
| 2012/0096165 A1 | 4/2012 | Madduri et al. |
| 2013/0212576 A1 | 8/2013 | Huang et al. |
| 2015/0169340 A1* | 6/2015 | Haddad ............... G06F 9/45533 718/1 |
| 2015/0370608 A1* | 12/2015 | Dipol .................. H04L 67/1025 718/104 |
| 2016/0283513 A1* | 9/2016 | Antony ................. G06F 16/188 |
| 2016/0357867 A1* | 12/2016 | Seolas ................. G06F 16/9566 |
| 2017/0075711 A1* | 3/2017 | Berrange ............ G06F 9/45558 |
| 2019/0068402 A1* | 2/2019 | Mazarick .............. H04L 12/467 |

* cited by examiner

*Primary Examiner* — Charles M Swift

(57) ABSTRACT

A computer system includes hosts for hosting virtual infrastructures. Compute resources provided by the hosts are allocated to user groups (e.g., departments, projects) in the form of reservations that define amounts of resources available to the user groups. Tags can be associated with both hosts and with reservations. A reservation has access to resources of a host having a host tag that matches a user tag associated with the reservation. Thus, to make a host available to a reservation, either 1) a tag can be added to the reservation to match a tag of the host, or 2) a tag can be added to the host to match a tag of a reservation. This can be more convenient than a case in which both a host and a reservation must be configured to give the reservation access to the host.

12 Claims, 4 Drawing Sheets

TAG-BASED CONTROL OF HOSTED COMPUTE RESOURCES

BACKGROUND

In cloud automation systems, when a user group needs additional resources, a virtual-infrastructure administrator can provide new hardware resources. A cloud administrator can then assign the new resources to the user group. The two administrators must synchronize to provide the increased resources to the user group.

DETAILED DESCRIPTION

Herein, tag-based control of hosted compute resources allows compute resources available to a user group to be modified simply and by a single administrator. This can save time and effort over the conventional approach in which two administrators must synchronize.

Figure 1:
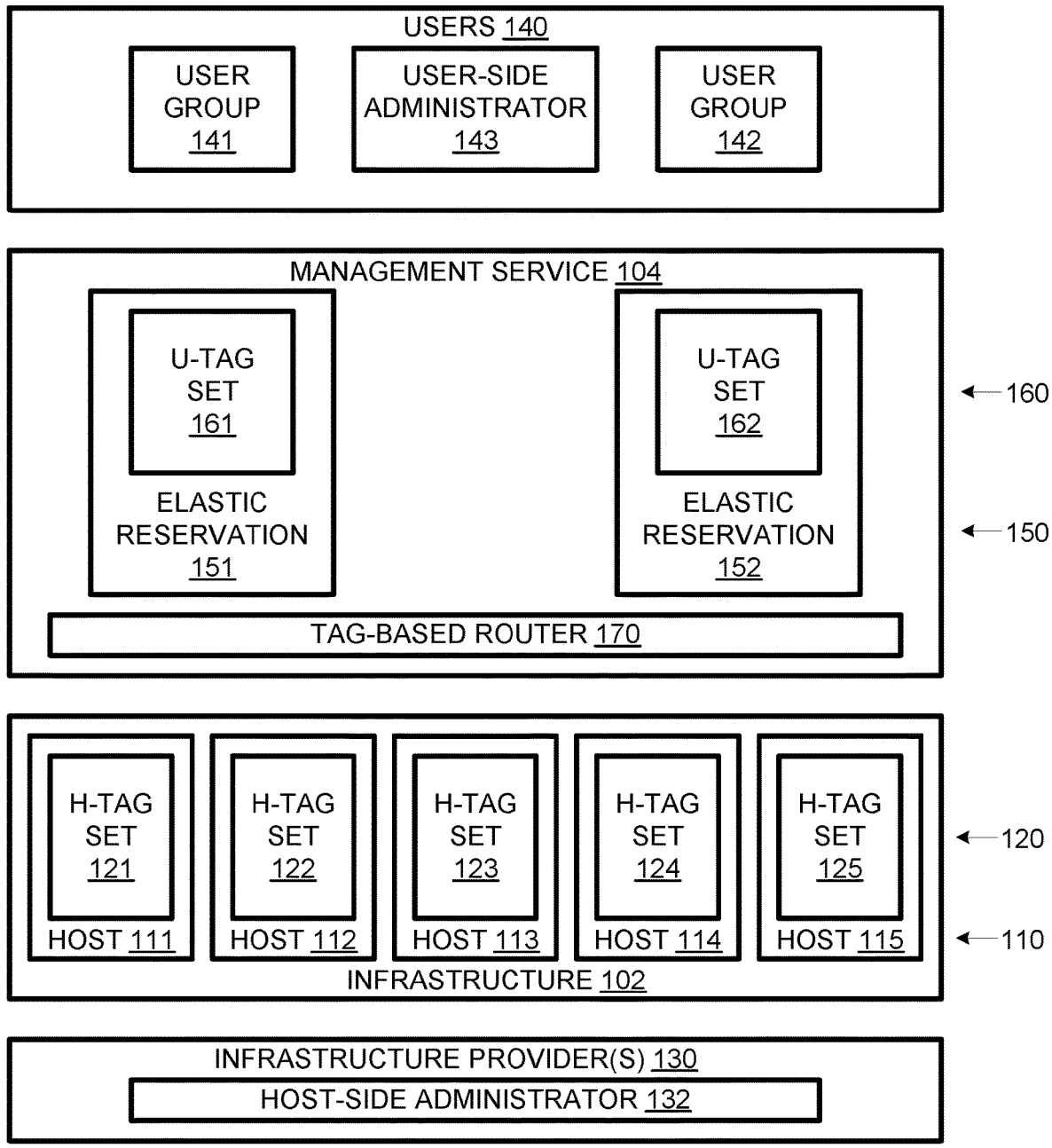
FIG. 1 is a computer system providing for tag-based control of hosted compute resources.

As shown in FIG. 1, a computer system 100 includes an infrastructure 102 and a management service 104. Infrastructure 102 includes plural hosts 110, including hosts 111, 112, 113, 114, and 115. In some scenarios, the hosts can be provided by one or more cloud providers and/or an on-premises computer system. Typically, each host 110 can be a hardware/software stack capped by a hypervisor that can support user virtual infrastructures, virtual machines and/or user process containers.

Associated with each host is a respective set 120 of host tags, which can include zero, one, or more "host" tags, aka, H-tags. For example, host-tag sets 121, 122, 123, 124, and 125 are associated respectively with hosts 111, 112, 113, 114, and 115. Infrastructure 102 can be provided by one or more infrastructure providers 130 and be managed by one or more host-side administrators 132.

Users 140 can include different groups, e.g., departments or projects, that each of which can be assigned its own allocation of compute resources, e.g., hardware resources such as processing capacity, memory, storage capacity, and communications bandwidth, of infrastructure 102, software resources such as utilization monitors, and intangible resources such as software e licenses. For example, users 140 include user group 141 and user group 142. In addition, users 140 can include 140 can include a user-side administrator 143 (which is a role that can be served by one or more humans).

Conventionally, user groups are assigned to reservations of compute capacity with each reservation being directly assigned to a compute host. However, management service 104 employs "elastic" reservations 150, e.g., elastic reservations 151 and 152, for which the connections to hosts is subject to tag-based control. This allows reservations to be expanded, contracted, and otherwise modified using tags 160. To this end, each elastic reservation includes a respective user-tag set of zero, one, or more user tags, aka, U-tags. For example, user tag sets 161 and 162 are respectively associated with reservations 151 and 152.

A tag-based router 160 controls connections between elastic reservations and hosts according to respective tags. In other words, a connection is made based on matches between host tags 120 and user tags 160. For example, user-side administrator 143 can modify the resources available to user group simply by modifying the user tag set of the corresponding elastic reservation. Alternatively, the resources available to a user group can be modified by modifying or creating a host tag for a host.

Figure 2:
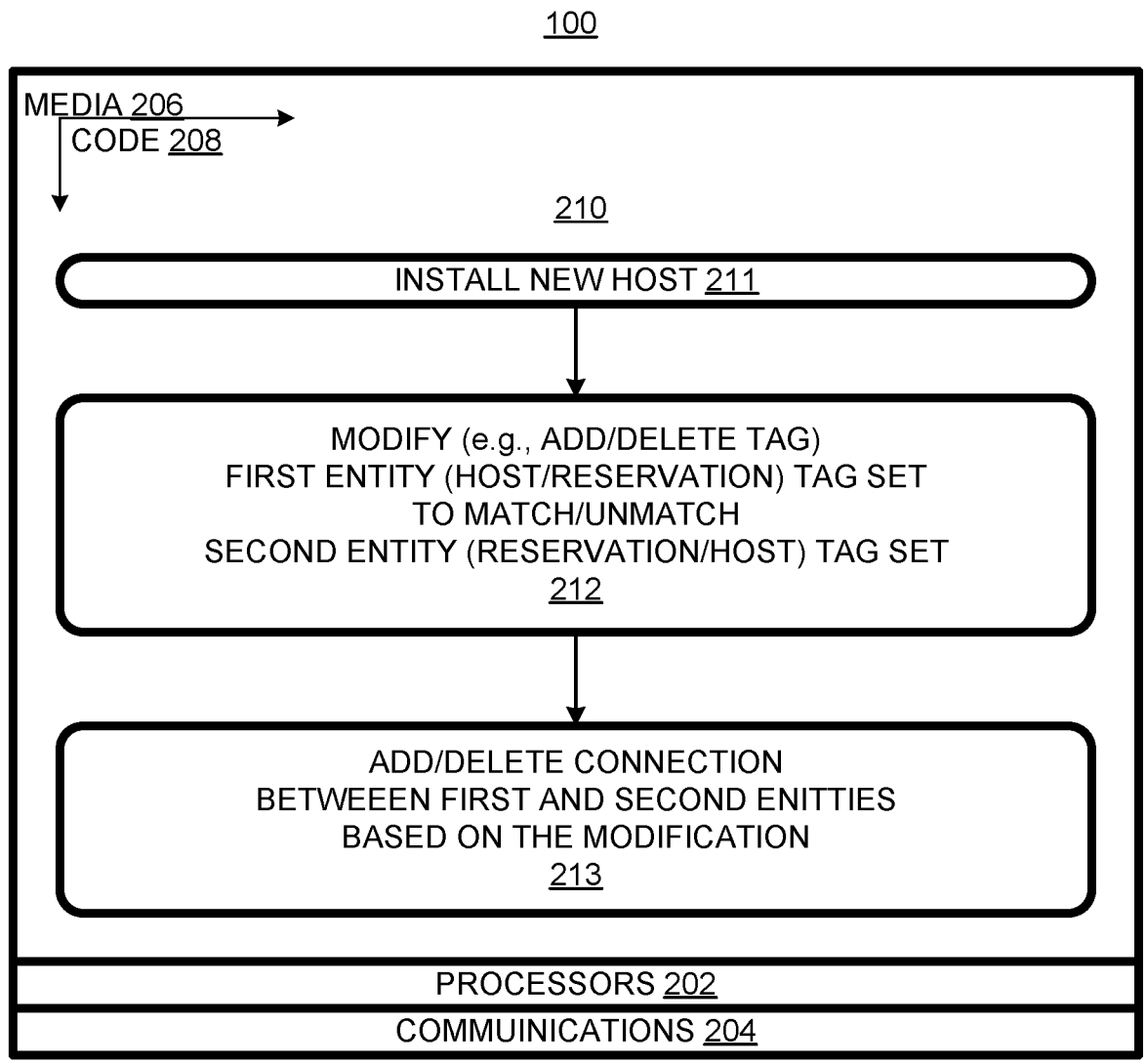
FIG. 2 is an alternate view of the computer system of FIG. 1 depicting a flow chart of a process implementable in the computer system of FIG. 1.

Computer system 100 is presented alternatively in FIG. 2 including processors 202, communications devices 204 (including network and input/output devices), and non-transitory media 206 (including memory and mass storage). Code 208 encoded in media 206 provides for a tag-based resource-reservation process 210 that can be implemented on computer system 100 as well as on other systems. In some cases, a new host can be installed at 211, e.g., in an on-premises computer system. However, process 210 can be practiced without installing a new host; in fact, installing a new host would not typically be performed in the case of subscribers of cloud services.

At 212, a tag set for a first entity is modified. The first entity can be a host or a reservation. The modification can involve adding one or more tags, deleting one or more tags, or some combination of tag additions and deletions. In the case of a tag addition, the result can be a new match between the added tag and a tag of a second entity, which would be a reservation in the event the first entity is a host, and which would be a host in the event the first entity is a reservation. In the case of a tag deletion, the result can be an "unmatch", i.e., the loss of a match, between the first entity and a second entity.

At 213, the tags are checked so that the modification can be detected. A new connection between the first and second entities can be made in the event of a new match; this would typically result in an expansion of resources available to the reservation. In the case of a new mismatch, a connection between the first and second entities can be broken; this would typically result in a reduction of resources available to a reservation. For more complex modifications, e.g., involving both additions and deletions, a variety of net effects can be achieved.

Figure 3:
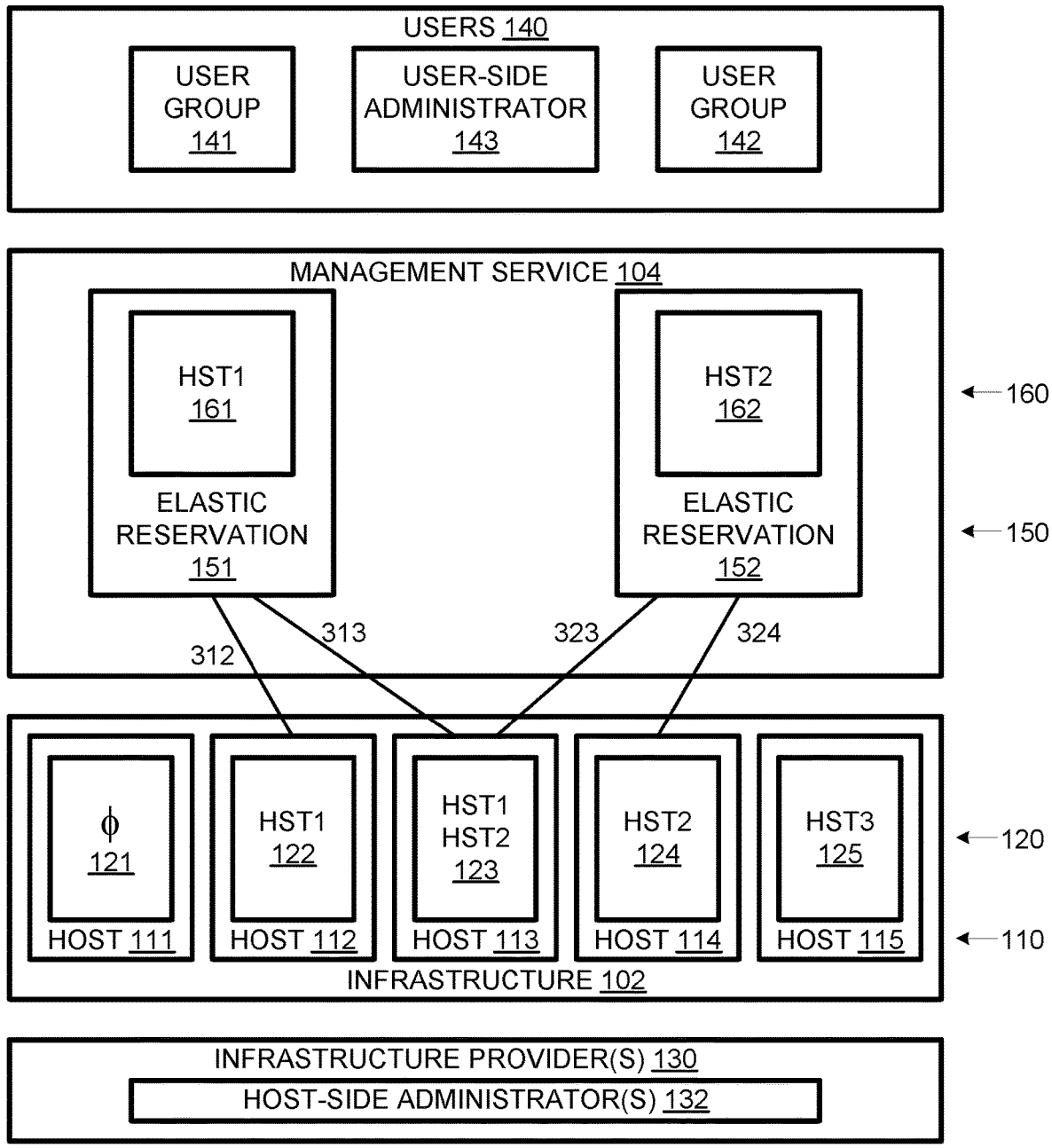
FIG. 3 is a pre-modification view of the computer system of FIG. 1.

Computer system 100 is shown in FIG. 3 at a time T1. User tag set 161 of elastic reservation 151 includes a user tag HST1; user tag set 162 of elastic reservation 152 includes a user tag HST2. Host tag set 121 is the null set, in other words, no tags have been assigned to host 111, e.g., because it has just been installed. Host tag sets 122, 124, and 125, respectively of hosts 112, 114, and 115 have host tags HST1, HST2, and HST3 respectively. Host tag set 123 of host 113 includes two tags, HST1 and HST2.

User tag HST1 of user tag set 161 of elastic reservation 151 matches host tag HST1 of host tag set 122 of host 112. Hence, a connection 312 is made between elastic reservation 151 and host 122. This connection indicates that user group 141 has access to resources of host 111 via elastic reservation 151. User tag HST2 of user tag set 162 of elastic reservation 152 matches host tag HST2 of host tag set 124 of host 114. Hence, a connection 324 is made between elastic reservation 152 and host 124. This connection 324 indicates that user group 142 has access to resources of host 114 via elastic reservation 152. Host tag set 123 of host 113 includes host tags HST1 and HST2, which match user tags in both elastic reservations 151 and 162. Hence connections 313 and 323 are formed between host 113 and elastic reservation 151 and between host 113 and elastic reservation 152.

Figure 4:
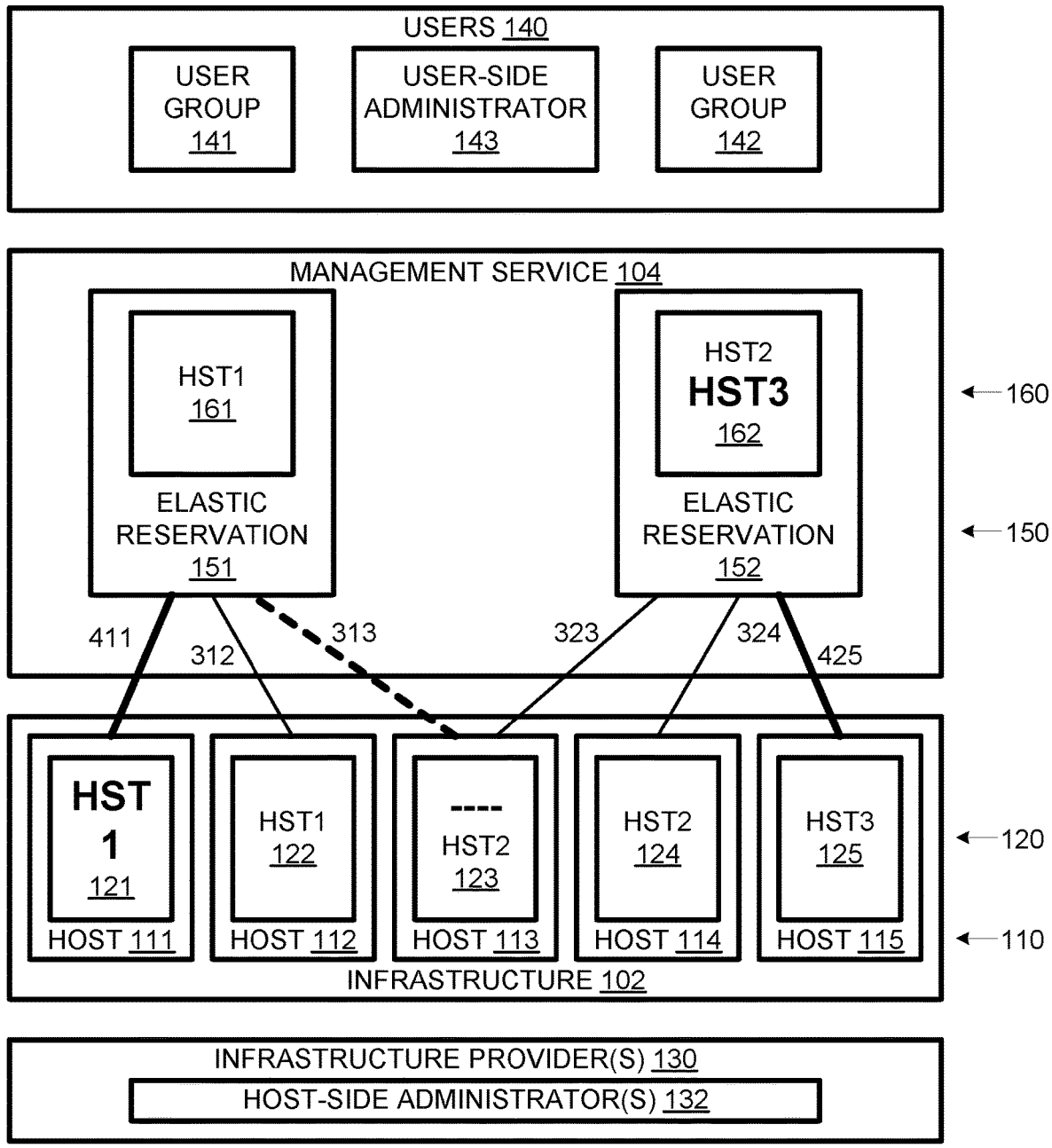
FIG. 4 is a post-modification view of the computer system of FIG. 1.

Modifications to the tag sets are represented in FIG. 4. In the first modification, a host tag is added to host tag set 121 of host 111. In one scenario, host 111 belongs to an on-premises system that is controlled by an enterprise that includes users 140. In that scenario, host 111 has recently been installed and, so, initially has no tags assigned (as shown in FIG. 3). The infrastructure-side administrator 132 adds the tag HST1, e.g., as part of the installation process. Alternatively, the tag can be added at a later time.

In another scenario, host 111 is provided by a cloud provider, e.g., Amazon Web Services or Microsoft Azure. In this scenario, a user-side administrator 143 adds the H-tag by associated it with an identity of host 111 in a database included with management service 104. In either scenario, the new host tag is recognized and, in response, a new connection 411 is formed between host 111 and elastic reservation 151 (which has a matching user tag).

In a second modification of a tag set, user tag set 162, which has contained an HST2 user tag, of elastic reservation 152 is modified by adding an HST3 user tag. This tag matches the host tag associated with host-tag set 125 of host 115. Accordingly, a connection is formed between host 115 an elastic reservation 152. Note that user tag set 162 includes, post modification, plural tags, just as host tag set 123 included, pre-modification plural tags (FIG. 3).

In a third modification of a target set, host tag HST1 of host tag set 123 is deleted. As shown in FIG. 3, host tag set 123 includes, pre-modification, host tags HST1 and HST2. As shown in FIG. 4, host tag set 123 includes, post-modification, host tag HST2, while host tag HST1 is absent due to its deletion. In response to this deletion, connection 313 between host 113 and elastic reservation 151 is broken. Of course, other modifications are possible. For example, deleting user tag HST2 from user tag set 162 would break connections 323 and 324 to hosts 113 and 114, respectively.

What all these modifications have in common is that they can be performed by a single administrator. There is no need to synchronize or otherwise coordinate the actions between host-side and user-side administrators. For example, the resources available to an elastic reservation can be expanded simply: 1) by adding a user tag (that matches a host tag) to its user tag set; or 2) by adding a host tag that matches a user tag of an elastic reservation to a host tag set.

Herein, a computer system is a combination of software programs and hardware for executing the software programs. The hardware includes at least one processor, media (e.g., memory and mass storage), and communications devices (e.g., network devices and input/output devices.) An "operating system" is software designed to control the hardware and serve as an interface for other programs to the hardware. A "hypervisor" is a virtualizing operating system, e.g., an operating system that provides for virtual machines (virtual computers), virtual operating systems (process containers), and virtual infrastructures (virtual networks including processing nodes and storage nodes). Herein, "virtual" denotes something that is not but appears to be; e.g., a virtual machine is not a machine, but appears to be a machine, e.g., a computer, to software running on the virtual machine.

Herein, a "host" is a computer system that provides an environment on which other programs, including virtual entities, can run; the host provides resources that can be utilized by those other programs. The hosts herein are typically hypervisor stacks, that is a virtualizing operating system and the hardware on which it runs. Herein, a "res-ervation" is a computer environment for user programs that, at any given time, provides for real or virtual compute resources to those programs, where the resources can be real or virtual processors, memory, storage, communications bandwidth, etc. Herein, a reservation can be connected to one or more hosts that collectively provide resources to the reservation.

Herein, a "tag" is a label that can be assigned to an entity, e.g., a host or a reservation. Unlike an identifier, which uniquely identifies an entity, a tag can be applied to multiple entities to indicate relations between entities or membership to a common class. Herein, in the event that a host and a reservation share a tag, they are connected or soon will be. Thus, by adding or deleting tags, the connections between hosts can tags can be formed and broken. The result is that resources allocated to a reservation can be changed dynamically by changing the tags assigned to respective hosts and or reservations.

Herein, all art labelled "prior art", if any, is admitted prior art; all art not labelled "prior art", if any, is not admitted prior art. The illustrated embodiments, along with variations thereupon and modification thereto are provided for by the present invention, the scope of which is defined by the following claims.

What is claimed is:

1. A process comprising:
   modifying a first tag set of one or more tags, the first tag set being associated with a first entity, the entity being a hypervisor-host or a reservation in a computer system in which reservations provide users access to resources of hypervisor-hosts to which the reservations are respectively connected, the modifying resulting in an addition to the first tag set or a deletion from the first tag set of a first tag, wherein said modifying of said first tag set of one or more tags is performed by a single administrator such that there is no need to synchronize or otherwise coordinate actions between a host-side and user-side administrators; and
   at least in part in response to the modifying, adding or deleting a connection between the first entity and a second entity, the first and second entity collectively including a hypervisor-host and a reservation, each hypervisor-host being a computer system including a hypervisor and hardware controlled by that hypervisor, the second entity having associated therewith a second tag set including a second tag that matches the first tag, wherein said first tag can be applied to multiple entities to indicate relations between entities or membership to a common class.

2. The process of claim 1 wherein the modifying includes adding the first tag to the first tag set with the result that the connection between the first entity and the second entity is added.

3. The process of claim 1 wherein the modifying includes deleting the first tag from the first tag set with the result that the connection between the first entity and the second entity is deleted.

4. The process of claim 1 wherein, either before or after the modifying, the first tag set contains at least third and fourth tags, the first entity having a connection to a third entity having a third tag set including a fifth tag matching the third tag, the first entity having a connection to a fourth entity having a fourth tag set including a sixth tag matching the fourth tag, the third and fourth entities being separate.

5. The process of claim 1 further comprising, prior to the modifying, installing a host in the computer system, the additional host being the first entity, the first tag set being modified to include the first tag, the first tag being associated with the host.

6. The process of claim 5 wherein the adding or deleting a connection includes adding a connection between the host and the second entity, the second entity being a reservation.

7. A system comprising non-transitory media encoded with code that, when executed by a processor, implements a process including:

modifying a first tag set of one or more tags, the first tag set being associated with a first entity, the entity being a hypervisor-host or a reservation in a computer system in which reservations provide users access to resources of hypervisor-hosts to which the reservations are respectively connected, the modifying resulting in an addition to the first tag set or a deletion from the first tag set of a first tag, wherein said modifying of said first tag set of one or more tags is performed by a single administrator such that there is no need to synchronize or otherwise coordinate actions between a host-side and user-side administrators; and at least in part in response to the modifying, adding or deleting a connection between the first entity and a second entity, the first and second entity collectively including a hypervisor-host and a reservation, each hypervisor-host being a computer system including a hypervisor and hardware controlled by that hypervisor, the second entity having associated therewith a second tag set including a second tag that matches the first tag, wherein said first tag can be applied to multiple entities to indicate relations between entities or membership to a common class.

8. The process of claim 7 wherein the modifying includes adding the first tag to the first tag set with the result that the connection between the first entity and the second entity is added.

9. The process of claim 7 wherein the modifying includes deleting the first tag from the first tag set with the result that the connection between the first entity and the second entity is deleted.

10. The process of claim 7 wherein, either before or after the modifying, the first tag set contains at least third and fourth tags, the first entity having a connection to a third entity having a third tag set including a fifth tag matching the third tag, the first entity having a connection to a fourth entity having a fourth tag set including a sixth tag matching the fourth tag, the third and fourth entities being separate.

11. The process of claim 7 further comprising, prior to the modifying, installing a host in the computer system, the additional host being the first entity, the first tag set being modified to include the first tag, the first tag being associated with the host.

12. The process of claim 11 wherein the adding or deleting a connection includes adding a connection between the host and the second entity, the second entity being a reservation.

* * * * *